L. B. HOIT & M. LAFLIN.

Improvement in Harvesters.

No. 4,782.

Reissued March 5, 1872.

Witnesses.

Harry King.

Phil. T. Dodge.

Inventors.

L. B. Hoit &

Matthew Laflin.

By Dodger & Munn

AM. PHOTO-LITHOGRAPHIC CO. N.Y. (OSBORNE'S PROCESS.)

UNITED STATES PATENT OFFICE.

L. B. HOIT, OF CEDAR FALLS, IOWA, AND MATTHEW LAFLIN, OF CHICAGO, ILLINOIS; L. B. HOIT ASSIGNS HIS INTEREST TO MATTHEW LAFLIN.

IMPROVEMENT IN HARVESTERS.

Specification forming part of Letters Patent No. 92,723, dated July 20, 1869; reissue No. 4,782, dated March 5, 1872.

SPECIFICATION.

*To all whom it may concern:*

Be it known that L. B. HOIT, of Cedar Falls, Black Hawk county, Iowa, and MATTHEW LAFLIN, of Chicago, in the county of Cook and State of Illinois, did invent certain new and useful Improvements in Harvesters; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use the invention, I will proceed to describe it.

Figure 1:
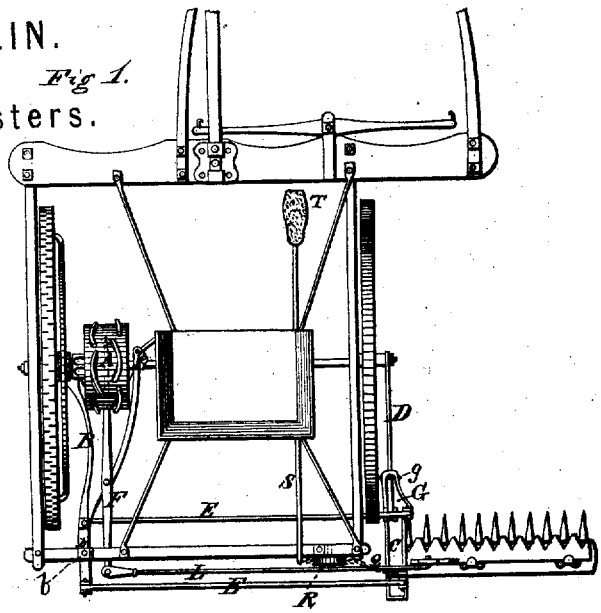
Figure 4:
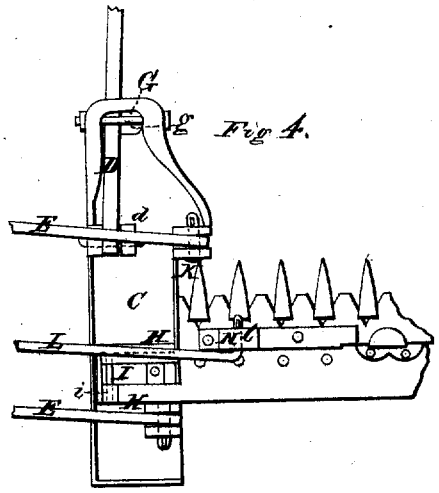
Figure 5:
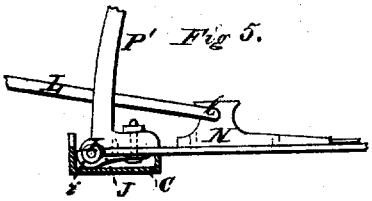
Figure 2:
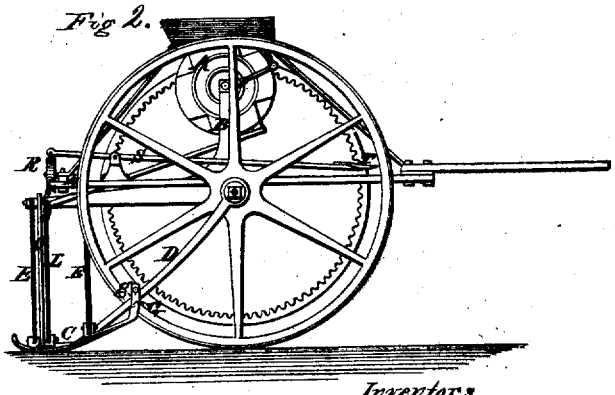
Figure 6:
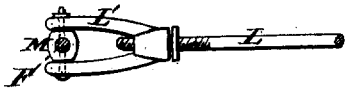

Figure 1 represents a plan view of the machine; Fig 2, a side elevation of the same; and Fig. 3, a rear elevation. Fig. 4 is an enlarged view of the oscillating shoe. Fig. 5 is a sectional view of the connection between the finger-bar and the shoe, and Fig. 6 is a side view of the swivel-ring of the parallel-motion device.

The invention consists in certain improvements upon the harvester patented to L. B. HOIT January 23, 1866, the said improvements consisting of a novel manner of constructing and hinging the shoe, whereby it and the finger-bar are adapted to adjust themselves to the undulations of the surface with ease and facility. It also consists in a novel method of connecting the finger to the shoe, whereby it can be quickly attached or detached; and, finally, it consists in a novel combination of devices for imparting motion to the sickle, whereby the operating mechanism is rendered extremely simple and efficient, all as hereinafter more fully explained.

Figure 3:
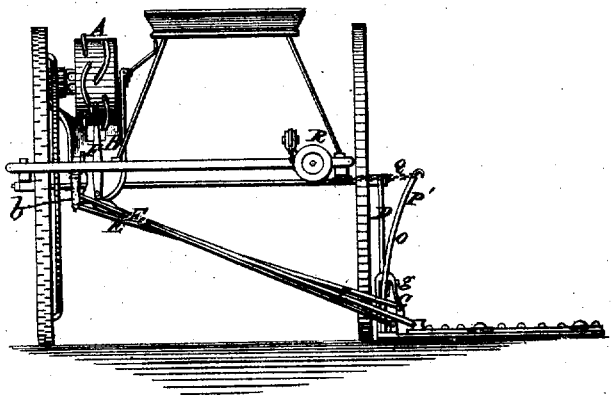

The eccentric-wheel A, called in HOIT'S original patent "a cam-wheel, *e*," with its roller and pitman-lever F, is placed, in the present machine, on the side of the machine opposite to that on which the sickle-bar is attached, for the purpose of obviating the side draft of the machine when working. Frame B, supporting the eccentric-wheel A, is made shorter, having its rear end firmly secured to the frame of the machine by stanchion or stirrup *b*, as shown in Fig. 3. C is the oscillating shoe, made of cast-iron, and rounded behind for the purpose of easily sliding over the ground when the machine is backed, and provided with a slot, G, in front. A curved bar, D, passes through said slot G, and has its lower end pivoted to the studs *d* near the center of the shoe, while its upper end is provided with a ring which is put over the axle of the machine. Bar D, while it drags the shoe, plays in the slot G, permitting the shoe and the guards of the finger-bar secured to it to oscillate up and down, and thus to conform to and overcome the inequalities of the ground. Pin *g* regulates the play of the bar D in the slot G, thus regulating the height of the guards to cut higher or lower. Braces E E, pivoted to the frame B and to the shoe C, keep said shoe in its proper place and off the wheel of the carriage. The connection of the finger-bar with the shoe is effected in an entirely novel way. Two partitions, H H, of the shoe C form a chamber, in which the end of the finger-bar snugly rests, and which hold it fast when the bar strikes against any obstruction during the working of the machine. A cylindrical pin, I, is secured between and to the partitions H H, and the plate J secured to the end of the finger-bar in the shape of a hook, which hook *i* by passing under and partially around the cylinder I, forms a perfect lock. This arrangement, forming a secure connection between the shoe and the finger-bar, permits, at the same time, a free raising or lowering of the outer end of the bar to pass it over obstructions, as also affords an easy means of attaching the finger-bar to or detaching it from the machine, and when so detached the bar is placed on the cross-piece of the frame of the machine, where proper stanchions or hooks are placed to receive it. The device for raising and lowering the outer end of the finger-bar consists of an angular lever, O, having its fulcrum on the cylindrical pin I of the shoe C, the end of its horizontal arm P being secured to the finger-bar, and its vertical arm P′ connected with foot-treadle lever S by means of chain Q passing under and around pulley R secured to the frame of the machine, so that the driver, by pressing down the treadle T, can raise the outer end of the finger-bar. The oscillating shoe C is so constructed as to form a recess, K, on the outside for the purpose of placing the first guard of the finger-bar in said recess, and on the line with that side of the shoe, the object of this being to allow the knives between the first two guards to cut grass independently when the finger-bar is elevated at an angle, and to compel grass to fall between the said guards, thus obviating the choking of the machine. The device by which the pitman is connected to the oscillating lever F consists of but two pieces, one of which, M, is made in the form of a ball or plate having a hole through its center so that it can be slipped onto the end of the lever F, and has journals or trunnions projecting from its opposite sides, as shown in Fig. 6. The other piece consists of a stirrup, L′, which has a hole made longitudinally through its closed end with a screw-thread cut therein, into which the end of the pitman is inserted and secured by a jam-nut. The free ends of the arms of this stirrup L′ have holes through them of proper size to fit on the trunnions of the part M, as represented. When thus formed these arms of the stirrup L′ are spread apart sufficiently to permit the trunnions of the part M to be inserted when the arms are simply pressed together, and thus held securely in place on the trunnions, as represented in Fig. 6. The part M turns freely on the end of the lever F, while the stirrup turns freely on the trunnions of the part M, thus forming a compound joint which adapts itself readily to the compound movement of the lever F and the pitman L.

Having thus described said invention, what I claim is—

1. The shoe C, having its front and rear ends rounded underneath, with its front end slotted and pivoted to the drag-bar near its center, said drag-bar passing loosely through the slot in the front end of the shoe, whereby the shoe is left free to oscillate in the line of its movement, and thus to cause the finger-bar and sickle to adapt themselves to the undulations of the surface and also cut close to the ground.

2. The finger-bar, provided with the hook *i* at its inner end, in combination with the shoe C, provided with the pin I, arranged to operate as described.

3. The combination of the cam-wheel A, pivoted lever F, joint M L′, and pitman L, connected to the cutter-bar, all constructed and arranged to operate substantially as described.

MATTHEW LAFLIN.

Witnesses:
R. H. WALLACE,
P. H. WITE.